US012731567B2

(12) United States Patent
Smoot et al.

(10) Patent No.: US 12,731,567 B2
(45) Date of Patent: Sep. 8, 2026

(54) WATER HARP WITH OPTICAL SENSING OF THE BREAK OF FLOWING WATER STREAMS

(71) Applicant: DISNEY ENTERPRISES, INC., Burbank, CA (US)

(72) Inventors: Lanny S. Smoot, Thousand Oaks, CA (US); Robert J. Bristow, Shadow Hills, CA (US); David James Myers, Orlando, FL (US); Gary A. Powell, Alta Loma, CA (US); Charles Jacob Sedor, Orlando, FL (US); Keith Jeffrey Mazzella, Gotha, FL (US); Steven I. Smith, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 833 days.

(21) Appl. No.: 18/128,159

(22) Filed: Mar. 29, 2023

(65) Prior Publication Data

US 2024/0331670 A1 Oct. 3, 2024

(51) Int. Cl.
*G10H 3/18* (2006.01)
*G10H 1/32* (2006.01)

(52) U.S. Cl.
CPC ................. *G10H 3/18* (2013.01); *G10H 1/32* (2013.01); *G10H 2220/181* (2013.01); *G10H 2220/415* (2013.01); *G10H 2230/125* (2013.01)

(58) Field of Classification Search
CPC ....... G10H 2220/415; G10H 2220/411; G10H 1/0553; G10H 2220/421; G10H 2250/411; G10H 2230/125; G01V 8/10
See application file for complete search history.

(56) References Cited

U.S. PATENT DOCUMENTS 4,627,326 A * 12/1986 McFarland ............... G10F 1/06 84/94.2
6,696,634 B1 * 2/2004 Zuloff ...................... G10H 1/32 84/744

(Continued)

FOREIGN PATENT DOCUMENTS

CN 2722379 Y * 8/2005
EP 1506060 B1 * 9/2005 ............. B05B 1/002

(Continued)

OTHER PUBLICATIONS

Dietz, et al., "Submerging Technologies", https://dl.acm.org/doi/10.1145/1179133.1179164, Jul. 30, 2006, 1 Page.

(Continued)

*Primary Examiner* — Jeffrey Donels
(74) *Attorney, Agent, or Firm* — Dorsey & Whitney LLP

(57) ABSTRACT

A system for simulating operation of a stringed instrument using a combination of water and light steams. The system includes a nozzle configured for outputting a falling laminar water stream. The system includes a light transmitter configured to inject light into a first end of the water stream and a light receiver configured to receive the light injected into the water stream and, in response, generate a signal. The system includes a controller configured for processing the signal and, in response to a lack of the signal, for operating an audio system to play a musical note or audio file. The system may include an optical fiber with a first end proximate to the nozzle oriented to receive the light injected into the water stream at the second end of the water stream, and the light receiver can be a photodetector coupled to the second end of the optical fiber.

24 Claims, 8 Drawing Sheets

(56) References Cited

U.S. PATENT DOCUMENTS

| | | | | |
|---|---|---|---|---|
| 2007/0188178 | A1* | 8/2007 | Dietz | G01V 8/10<br>324/661 |
| 2009/0241753 | A1* | 10/2009 | Mann | G10H 1/34<br>84/384 |

FOREIGN PATENT DOCUMENTS

| | | | | | |
|---|---|---|---|---|---|
| GB | 2388632 | A | * | 11/2003 | B05B 1/3402 |
| KR | 101429099 | B1 | * | 8/2014 | G10D 1/04 |
| KR | 20140119918 | A | * | 10/2014 | G10D 1/04 |
| KR | 101475943 | B1 | * | 12/2014 | G10D 1/04 |

OTHER PUBLICATIONS

Dietz, Paul, "Submerging Technologies", https://youtu.be/FIBPmuacOYY [Video], Nov. 27, 2012.

Dietz, Paul, "The Aquaharp", https://youtu.be/XXNqez6L_bw, [Video], Aug. 30, 2021.

* cited by examiner

WATER HARP WITH OPTICAL SENSING OF THE BREAK OF FLOWING WATER STREAMS

BACKGROUND

1. Field of the Description

The present description relates, in general, to interactive display or play systems that combine interaction with water with audio and visual effects, and, more particularly, to a new system for providing an interactive water harp for use in a wide variety of outdoor (and indoor) settings including amusement and theme parks.

2. Relevant Background

In many outdoor spaces and venues, it is desirable to provide water-based entertainment that allows visitors to interact with and play in water in an interactive manner. This allows the visitors to stay cool while having fun and, in some cases, being surprised and excited when they can affect operations of the display device. A water harp is an example of such water-based entertainment system, with a "player" being able to play or interact with the harp by strumming the strings of the harp that are provided as downward falling or flowing streams of water. Unfortunately, to date, there has not been a water harp design that is useful in all settings and that can address all challenges associated with their use in outdoor settings.

For example, one design for a water harp utilized a number of streams of falling water, which was provided with laminar flow, and the streams were arranged generally in a plane and to be spaced apart to appear to be like the strings of a large musical harp. People can play the water harp breaking, e.g., with their hands, arms, and so on, one or more of the water strings or streams. This water harp was configured to pass a small electrical current through each water stream or string to allow it to detect when each stream was broken via an interruption in electrical current. In response to detection of a broken or interrupted water stream, the water harp was configured to play the musical note associated with the broken water string or stream.

While this water harp worked well in some applications, it was not well accepted by many park operators. Because the water harp used small amounts of electrical current, some medical professionals urged that medical warnings be placed near each water harp even though the levels of current were below nearly all guidelines for electrical safety. Such warning placards or signage is not desirable in most settings including amusement and theme parks. Hence, there remains a need for new water harp designs that do not rely on electrical current in the harp strings and that do not require safety or health warnings for their operators.

SUMMARY

The inventors recognized there were numerous challenges with prior water harp systems, and, in response, a new water-based display or interactive play system was developed that uses water streams as the "strings" of the harp without use of electrical current or electrical components in or near water. The new system, in brief, utilizes the water streams, which are often provided as laminar streams, as optical conduits analogous to fiber-optic strands, and the system is configured to detect when light in these optical conduits (i.e., water streams) are blocked or interrupted. In response, the system plays (or provided audible outputs associated with) the notes assigned to each stream or "harp string."

More particularly, a system is provided for simulating operation of a stringed instrument using a combination of water streams and light traveling within such water streams. The system includes a nozzle configured for outputting a water stream, when supplied by a water source, that falls vertically and is substantially laminar. Further, the system includes a light transmitter configured to inject light into a first end of the water stream and a light receiver configured to receive the light injected into the water stream at a second end of the water stream and, in response, to generate a signal. The system also includes a controller configured for processing the signal and, in response to a lack of the signal, for operating an audio system to play a musical note or audio file. In some embodiments, the system includes an optical fiber with a first end proximate to the nozzle oriented to receive the light injected into the water stream at the second end of the water stream, and the light receiver is a photodetector coupled to the second end of the optical fiber.

To avoid issues with sunlight, the light transmitter can be positioned a vertical distance below the nozzle, and the first end of the water stream is the lower end so that the injected light travels upward to the nozzle and the light receiver (or an optical fiber feeding the receiver). In these embodiments, the system may also include a lens or lens system disposed between the nozzle and the light transmitter configured for receiving output light from the light transmitter and converting the output light into a stream of collimated light, with a 2-inch or greater outer diameter, that is directed upward toward the nozzle. Further, the system may include a water reservoir comprising two or more sidewalls and a bottom defining an interior space for receiving the water stream. The bottom is substantially transparent to light (e.g., formed of glass, a plastic, a ceramic, or the like), and the lens or lens system and the light transmitter are positioned in a dry space outside the water reservoir and arranged to direct the collimated light through the bottom of the water reservoir.

In some useful embodiments, the system further includes sloped landing pad disposed in the water reservoir to at least partially extend above a surface of water in the water reservoir, and the sloped landing pad being formed of substantially transparent material and positioned between the lens or lens system and the nozzle, whereby the first end of the water stream is located where the water stream contacts the sloped landing pad. In such embodiments, the system may include a solid 45-45-90-degree prism, and the sloped landing pad can be provided by a hypotenuse side of the solid 45-45-90-degree prism. Additionally, the system may include a light absorber on one of the sidewalls of the water reservoir at a location upon which the solid 45-45-90-degree prism directs a portion of the collimated light not passed through the hypotenuse side into the water stream.

It may be useful for the solid 45-45-90-degree prism to be integrally formed with the bottom of the water reservoir (e.g., with its hypotenuse side exposed to receive the water stream) or to be positioned below and optically bonded to the bottom of the water reservoir. In such embodiments, the bottom of the reservoir may extend from a first end mating with a first one of the sidewalls to a second end mating with a second one of the sidewalls, and the bottom of the water reservoir is sloped with the first end at a first angle relative to horizontal in the range of 52 to 54 degrees and with the second end at a second angle relative to vertical in the range of 36 to 38 degrees. In some cases, the light transmitter comprises an infrared (IR) light source (or other source of non-visible light), and, in such embodiments, the system may also include a visible light source directing its output onto the vertical side of the prism or other means for illuminating the water stream with visible light.

In these or other implementations of the system, at least a portion of the light transmitter, the lens or lens system, and the solid 45-45-90-degree prism are combined to form a light transmission assembly. The system includes a plurality of the light transmission assemblies, and the system further comprises a support frame with holders each holding one of the light transmission assemblies. The holders are slidably supported on a rack in the support frame, whereby each of the light transmission assemblies can be selectively positioned to adjust spacing between adjacent pairs of the light transmission assemblies.

DETAILED DESCRIPTION OF THE PREFERRED EMBODIMENTS

Briefly, the following description describes display systems (and corresponding display methods) that are configured or operable to produce water harps or to simulate operation of a stringed instrument using water streams in place of the strings of such instruments. The following description will provide the components of numerous possible water harps that each use a downward flowing and, typically, laminar flow of water as a string and as an optical conduit. The systems are each configured to detect or determine when light from a light transmitter fails to reach a light receiver or sensor, and, in response, to play one or more notes or other audible sounds (which includes tracks with more than one note).

As will become clear from this description, the inventors have designed water-based display or interactive play systems that address many if not all the challenges or problems associated with using a falling laminar water stream as an optical conduit analogous to a fiber optic strand. The problems include: (a) sunlight overloading the system; (b) wind moving the base of the falling stream out of alignment with the optical transmitter or the receiver; (c) random deflections of light as the laminar water stream falls into the reservoir of water at the base of the water harp causing a swirling and unpredictable divot or recessed dimple in the water surface; (d) crosstalk from light that is illuminating adjacent streams and making it difficult to "break" a stream's light (e.g., to play a string of the water harp) and, thus, causing a note not to be playable; and (e) having any electronics in contact with the water of the system.

Figure 1:
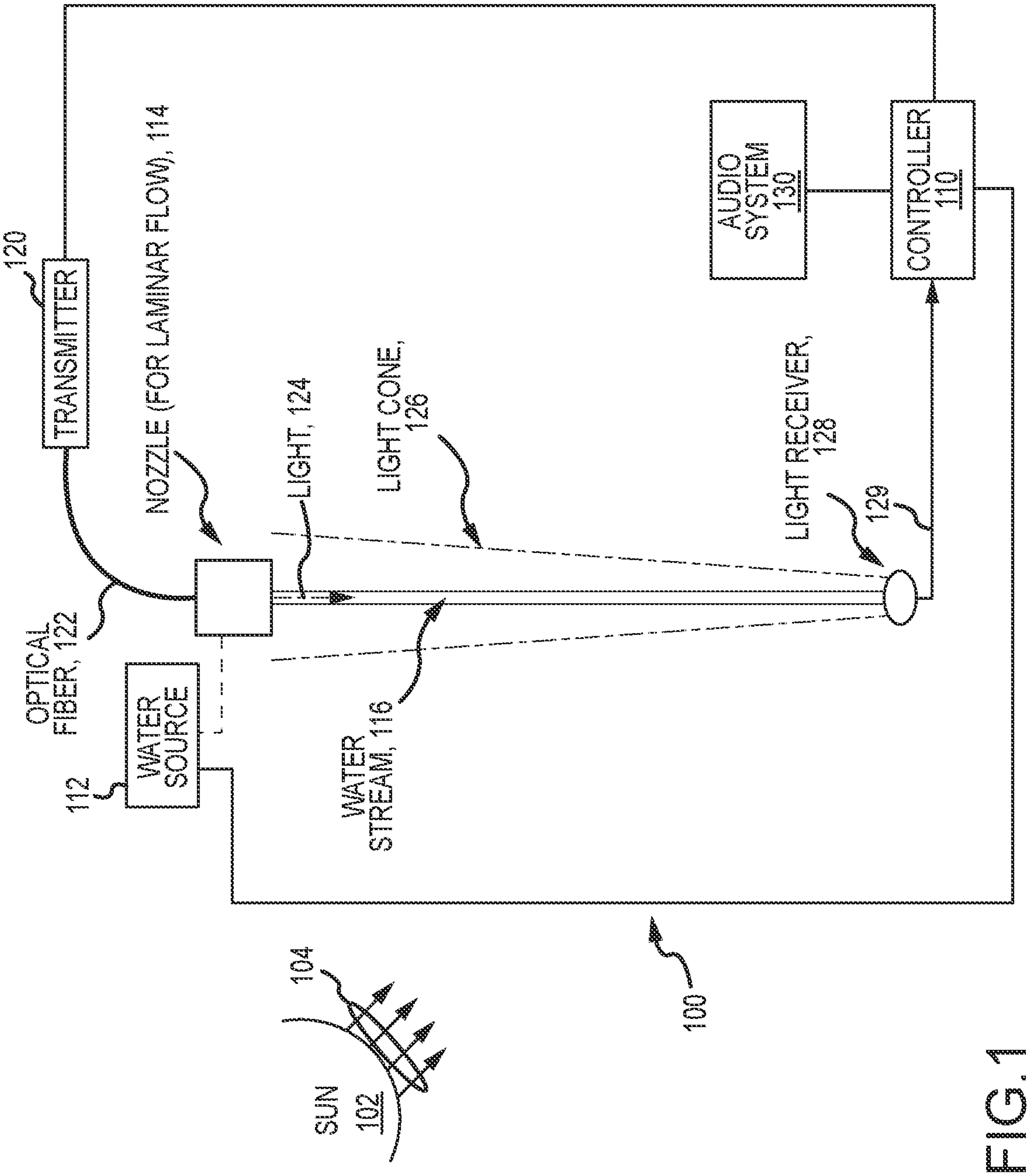
FIG. 1 illustrates a functional schematic or block diagram of a display or interactive play system for providing a water harp according to one aspect of the present description using downward directed light in a water stream.

The display or interactive play systems taught herein provide a water harp functionality. Each works in part by injecting light into each water stream (i.e., harp string) at one end and using the water stream as an optical stream in a manner analogous to the way light is carries in an optical fiber due to total internal reflection. FIG. 1 illustrates one such system 100 with one stream or "string" shown for simplicity with it being understood that two-to-many such strings or water streams would typically be used to allow two-to-many different notes to be played by a person interacting with the system or water harp 100.

As shown, the system 100 includes a controller 110, which may take the form of a computing device with a processor running one or more software modules or programs to provide the control functions described herein. The controller 110 is specifically adapted or configured to issue control signals to a water source 112 to feed water to a stream nozzle 114 to produce a water stream 116 that falls onto or directly above a light receiver 128. In some preferred embodiments, the nozzle 114 is chosen to output the water stream 116 so as to fall with laminar flow to better act similar to an optical fiber by providing total (or nearer to total) internal reflection of light injected into the stream 116.

The controller 110 also provides control signals to a light transmitter or source 120, such as a light emitting diode (LED) or the like when visible light is used in the system 100 or an infrared light source (or other nonvisible or not readily visible light source) when it is desired to disguise the presence of light in the stream 116. As shown, the light transmitter 120 may be positioned remote to the water 116 through the use of an optical fiber 122 that has its output end in or near the nozzle 114 to inject a stream of light 124 into the water stream 116 and to provide the light cone 126 targeted onto a light receiver 128. The light 124 generally is retained in the water stream 116 through internal reflection so that all or most of it reaches the light receiver 128. The light receiver 128 is chosen to output a signal 129 that is transmitted (e.g., via a wired connection) to the controller 110, with one embodiment using a photodetector that converts received light into electricity (or signal 129). For example, the photodetector may be or include a PIN diode and/or components with dielectric insulators at the top and bottom to provide the light receiver/detector 128.

The controller 110 is configured to detect the interruption or absence of the signal 129 as an indication that the stream 116 (and light 124 from transmitter 120) has been blocked or interrupted, such as would occur if a person were to move their hand through the stream 116 to play the water harp or system 100. In response to detecting an interruption in the light 124, the controller 110 is configured to generate a control signal or command to cause the audio system 130 to play a note or otherwise output sound (e.g., a musical note(s) or the like) over one or more speakers in the audio system 130. The system 100 is useful for providing a water harp functionality without using the water stream to conduct electricity as was the case in some prior water harp designs. In some environments, though, the system 100 may not operate as desired due to the presence of other light sources such as the sun 102, which may provide an amount of light 104 that overloads the system 100 such that even when the light 124 and water stream 116 are interrupted or blocked a large enough quantity of the light 104 would strike light receiver 128 and prevent the controller 110 from being able to accurately detect absence of light 124 and to play a note via operations of the audio system 130.

To address the issue with sunlight and other interfering light, a display or interactive play system 200 may be used. The system 200 is similar to the system 100 of FIG. 1 but with upward directed light 225, from a light transmitter or source 120 positioned directly below the nozzle 114, in the water stream 116 providing a light cone 226. The light 225 traveling in stream 116 may be injected into an inlet to a fiber 122 for transmission to the light receiver 128, which provides signals 129 indicating the existence of the light 225 in the stream 116. The system 200 (and later systems described herein would include the controller 110, the water source 112, and the audio system 130 of FIG. 1, with these components not shown for ease of explanation of the components that differ from system to system).

In brief, the system 200 was designed to inject light 225 at the bottom of each water stream 116 and receive it at the top, e.g., with the fiber 122 in (or on) the nozzle 114 emitting the water stream 116. Although the system 100 works with the receiver 128 at the bottom and with the transmitter 120 at the top, the system 200 is useful for allowing the receiver 128 to look downward so as to be at least somewhat shaded from direct sunlight 104 that could, in some cases, overload it.

Wind can also be problematic for systems 100 and 200 as it may move the water stream 116 from vertical path to one that is angled outward from the nozzle 114. FIG. 3 illustrates this in display or interactive play system 300, which has similar components as shown in system 100 of FIG. 1 and system 200 of FIG. 2 such that their description is not repeated with regard to system 300. As shown with arrow 308, wind may be present at the location of the system 300, and the wind may angularly displace the falling water stream 116 (e.g., at an angle in the range of 0 to 45 degrees or more). This could cause the stream 116 to miss the transmitter 120 in the system 200 while light 225 may still reach the receiver 128 via fiber 122 (or to miss the receiver 128 in system 100 while light 124 may still reach the receiver 128), which could cause the controller 110 to fail to detect when the stream 116 is broken or played or could cause the controller 110 to detect a break in the light stream due to wind moving the optical fiber provided by the stream 116.

Figure 2:
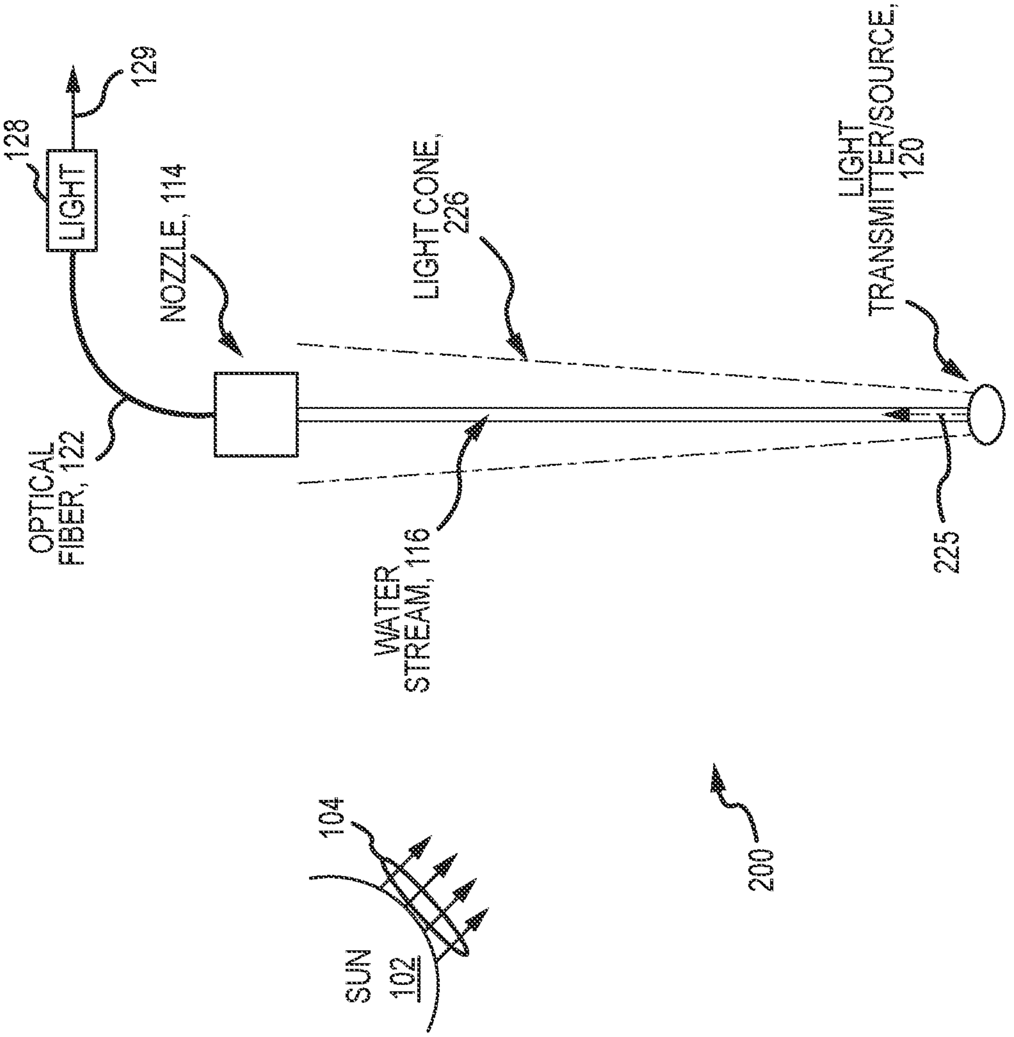
FIG. 2 illustrates a display or interactive play system similar to that of FIG. 1 but with upward directed light in the water stream.
Figure 3:
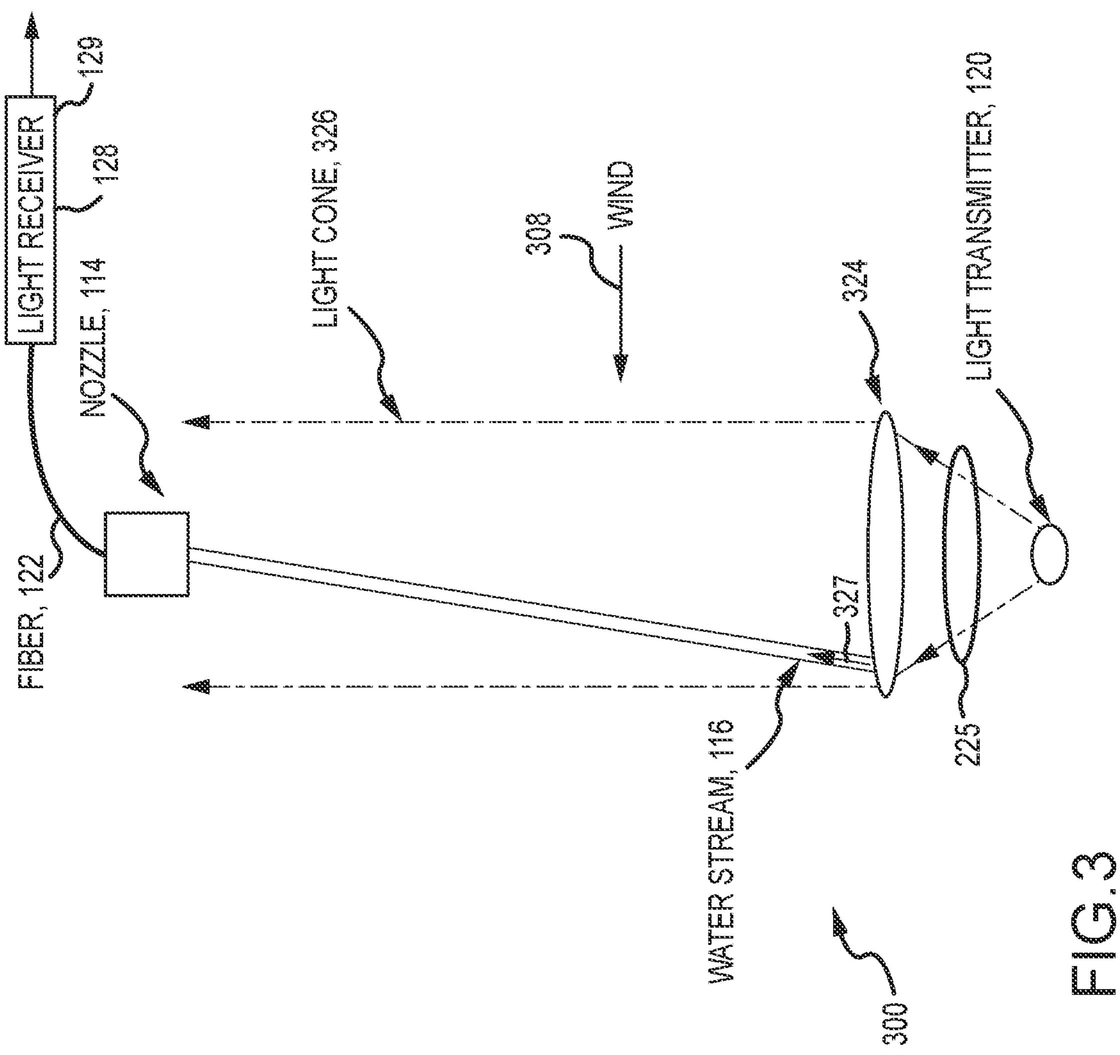
FIG. 3 illustrates another display or interactive play system that is similar to that of FIG. 2 but including a lens or lens system to collimate the upward directed light from the light transmitter or source.

To provide an enlarged landing pad for the stream 116, the system 300 is provided that is similar to that of FIG. 2 but includes a lens or lens system 324 that is disposed between the light transmitter 120 and receiver 128 such as at the bottom or near the bottom of the water stream 116. In the system 300, the lens or lens system 324 is shown to be configured to collimate the upward directed light 225 from the light transmitter or source 120 into a light cone 326 of collimated light, which as shown with arrow 327 will be injected into the bottom of the water stream 116 so as to travel up to the input end of fiber 122 for detection by receiver 128 and, in response, generation of signal 129. Stated differently, the lens or lens system 324 is configured to provide an enlarged upward moving light beam 326 such that light 327 will enter the stream 116 even when wind blows 308 it off a vertical path, and, to this end, the light beam or cone 326 of collimated light may have a diameter in the range of 1 to 12 inches or more so that the system 300 is impervious to wind moving the landing point of the water stream 116. The bottom of the water stream 116 may directly contact the upper surface of the lens or lens system 324 as shown in FIG. 3 or these may be offset some distance as discussed below for other embodiments.

Figure 4:
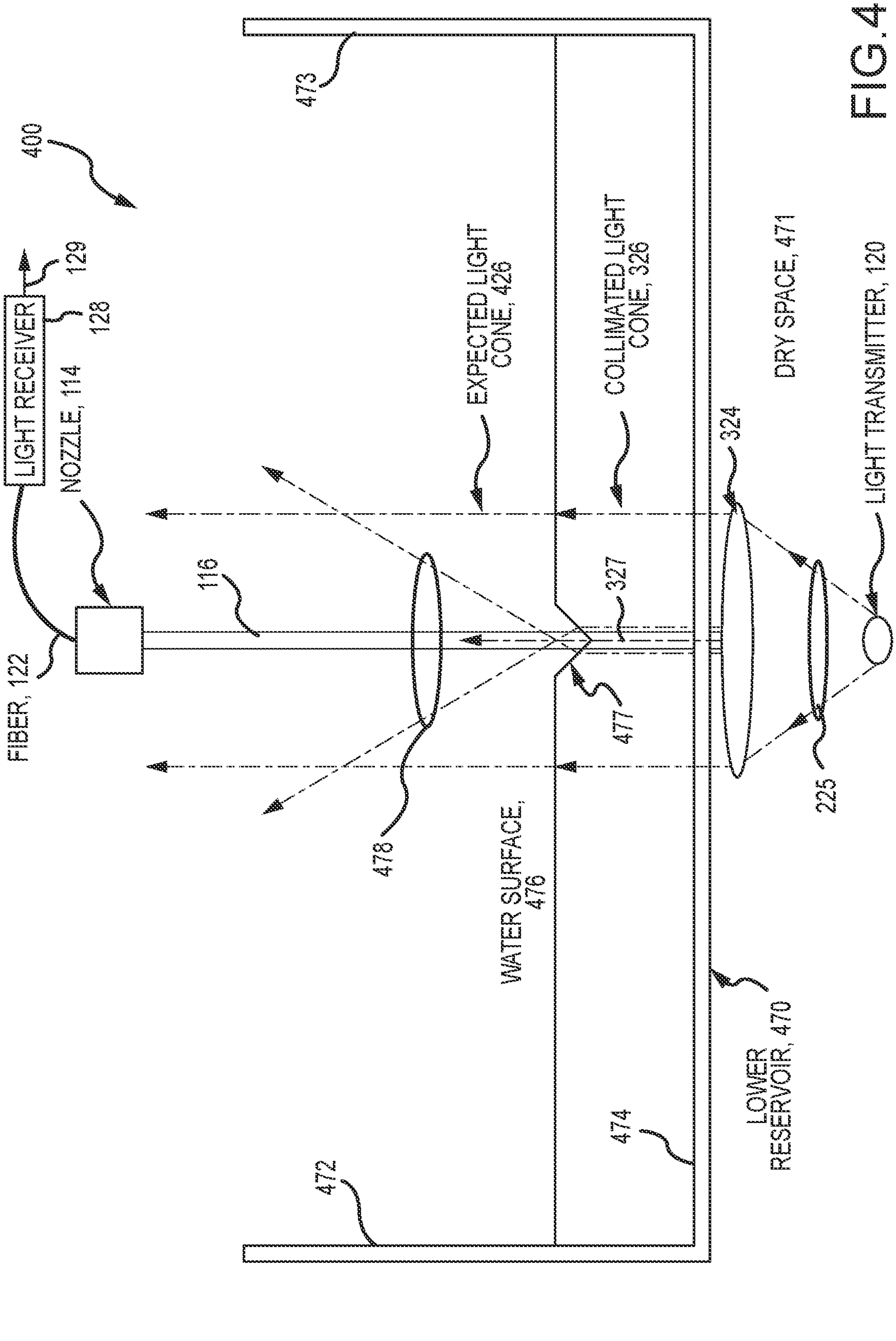
FIG. 4 illustrates a display or interactive play system implementing concepts shown in the system of FIG. 3 to move the lens or lens system and light transmitter out of the system's water reservoir or pool.

As noted above, it is often desirable to design water-based, interactive systems such that no electrical components are positioned within or in contact with the water of the system. To provide such an arrangement, FIG. 4 illustrates a display or interactive play system 400 implementing concepts shown in the system 300 of FIG. 3 with the lens or lens system 324 and light transmitter 120 out of the system's water basin or reservoir 470. Particularly, the system 400 includes a lower reservoir 470 in which water from the water stream(s) 116 can build up and be stored at least temporarily until it is optionally recirculated for later output through the nozzle(s) 114 or drained off to maintain the water surface 476 at a desired depth (such as 1 to 6 inches or the like). The reservoir 470 includes two or more (e.g., four) sidewalls 472, 473 along with a bottom 474.

The bottom 470 is formed of a material (e.g., glass, plastic, or the like) that is at least translucent to light and, more typically, transparent or nearly so. The light transmitter 120 is positioned below this bottom 474 in a dry space 471 and outputs its light 225 onto the lens or lens system 324, which is also positioned below the bottom 474 and arranged to provide a cone 326 of collimated light through the bottom 474 and water surface 476 where it can enter the water stream 116 as shown with arrow 327. As discussed with reference to FIG. 3, the light 327 in stream 116 is received and transmitted in optic fiber 122 to the light receiver 128, which responds by generating and transmitting signal 129 to the system controller.

The use of the lens 324 expands the size of the landing pad for the stream 116 to account for disturbances by wind while the use of a glass (or other transparent to translucent material) bottom 474 allows the transmitter 120 to be located in the dry space 471 out of the water in the reservoir 470. While the system 400 is useful in many applications, deflection of light 326 at the water surface 476 can be an issue. As shown in FIG. 4, a divot or dimple 477 can form in the water surface 476 at the bottom of the water stream 116. This can cause the collimated light cone 326 to deviate from the expected light cone 426 as the water divot or dimple 477 deflects light 478 in all directions such that no or an inadequate amount of light 327 is injected into the stream 116 for detection or sensing by the light receiver 128. As a result, the controller may play notes even though the water stream 116 is not "played" or interrupted by a person playing the harp or system 400.

To address the surface divot issue, a display or interactive play system can be provided by modifying one of the systems described above, such as system 400 of FIG. 4, to further including a sloped landing surface assembly or component. For example, a sheet of transparent material, such as glass, may be positioned within the reservoir 400 at an angle in the range of 30 to 60 degrees to the bottom. In one implementation, the system includes a hollow transparent component in the reservoir between the lens or lens system and the nozzle, with the transparent component having a 45-45-90-degree triangular cross-sectional shape. The upper wall of this component is sloped at 45 degrees that extends outward from the water surface. Such an arrangement addresses the dimpling of the water surface by providing a sloped landing surface above the lens or lens system. In some cases, though, wind can blow the water stream off its vertical path (as discussed with reference to FIG. 3), and this can result in a failure of the controller to detect when the water stream is interrupted as light may travel directly upward from the transmitter and lens/lens system rather than traveling in the water stream.

To address the issues with the surface divot and with wind redirecting the water stream, a display or interactive play system 500 may be utilized. The system 500 is similar to the system 400 of FIG. 4 but further includes a solid prism 550 to provide a sloped landing surface or prism side 551 and to ensure that only light 527 directed up the water stream 116 is detected via the fiber 122 and light receiver 128. In order to guarantee that light 326 from the lens 324 and transmitter 120 is conducted up the stream 116 as shown by arrow 527 (and not directly through the air), the system 500 employs a 45-45-90-degree right angle prism 550. The prism 550 is solid and formed of a transparent material such as glass, ceramic, plastic, and the like, and it is shown with an end view in FIG. 5 with its hypotenuse side 551 facing upward to provide the sloped landing surface for the stream 116 and with a first 552 of the two other sides (which meet at a right angle as shown) facing one of the reservoir sidewalls 473 (but could be side 472 in other embodiments) and a second 553 of the two other sides facing and typically abutting as shown the upper surface of the reservoir bottom 474.

Figure 5:
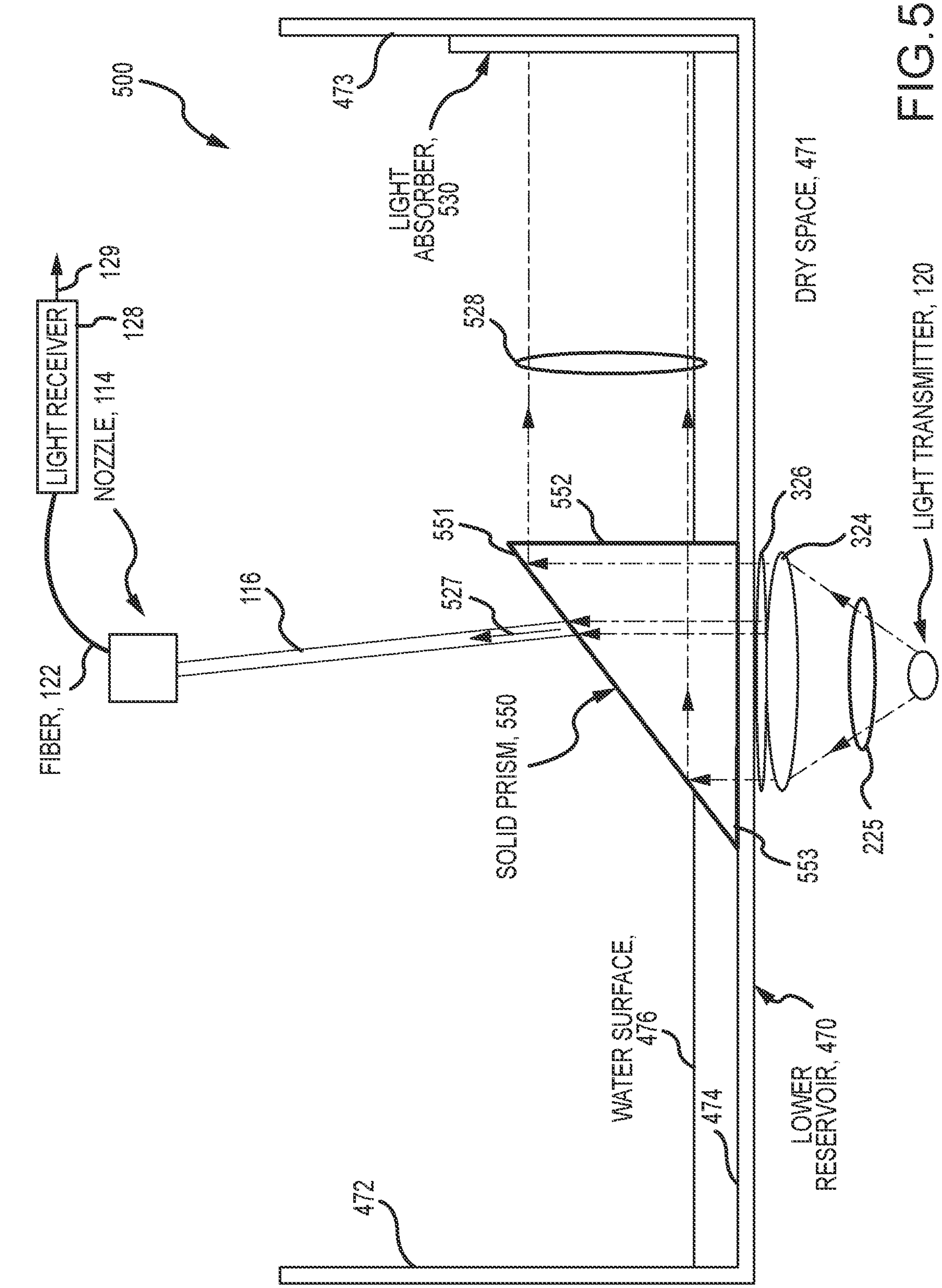
FIG. 5 illustrates a display or interactive play system embodiment similar to that of the system of FIG. 4 but further including a solid prism to provide a sloped landing surface and to ensure that only light directed up the water stream is detected.

In operations as shown in FIG. 5, the prism 550 is configured so as to deflect all upward going light 326 to the side 552 as shown with arrows 528 except where the falling stream 116 touches the prism's upper or hypotenuse side 551. At points where the stream bottom contacts the side 551, the water stream 116 index matches (or substantially index matches such as with a difference between indices of refraction within the range of 0.10 to 0.25) the prism 550 such that light 527 is not deflected with light 528 out the side 552 toward the reservoir sidewall 473. A pad or sheet 530 of light absorber material (e.g., a fuzzy material that may be painted or colored black) may be provided on the sidewall 473 to receive and wholly or partially absorb the redirected light 528 to limit reflection and possible interfering light streams.

In addition to index matching the stream 116 to the illuminating light source 120 via the prism 550, the sloped side or surface 551 of the prism 550 prevents or controls water turbulence, which would have occurred if the laminar stream 116 were allowed to directly land on the surface 476 of the water in the reservoir 470. Turbulence at this point could cause the amount of light 527 entering the stream 116 to fluctuate unacceptably widely and often to the point where the receiver 128 would lose the signal. The lens or lens system 324 converts the light 225 from the transmitter 120 to collimated light 326, and collimated light is preferred so that all the light 326 strikes hypotenuse side 551 of the prism 550 at a 45-degree angle where all but that corresponding with the bottom of the stream 116 will be totally internally reflected toward the side 552 as shown with arrows 528 to a light waste area provided by the light absorber 530.

Figure 6:
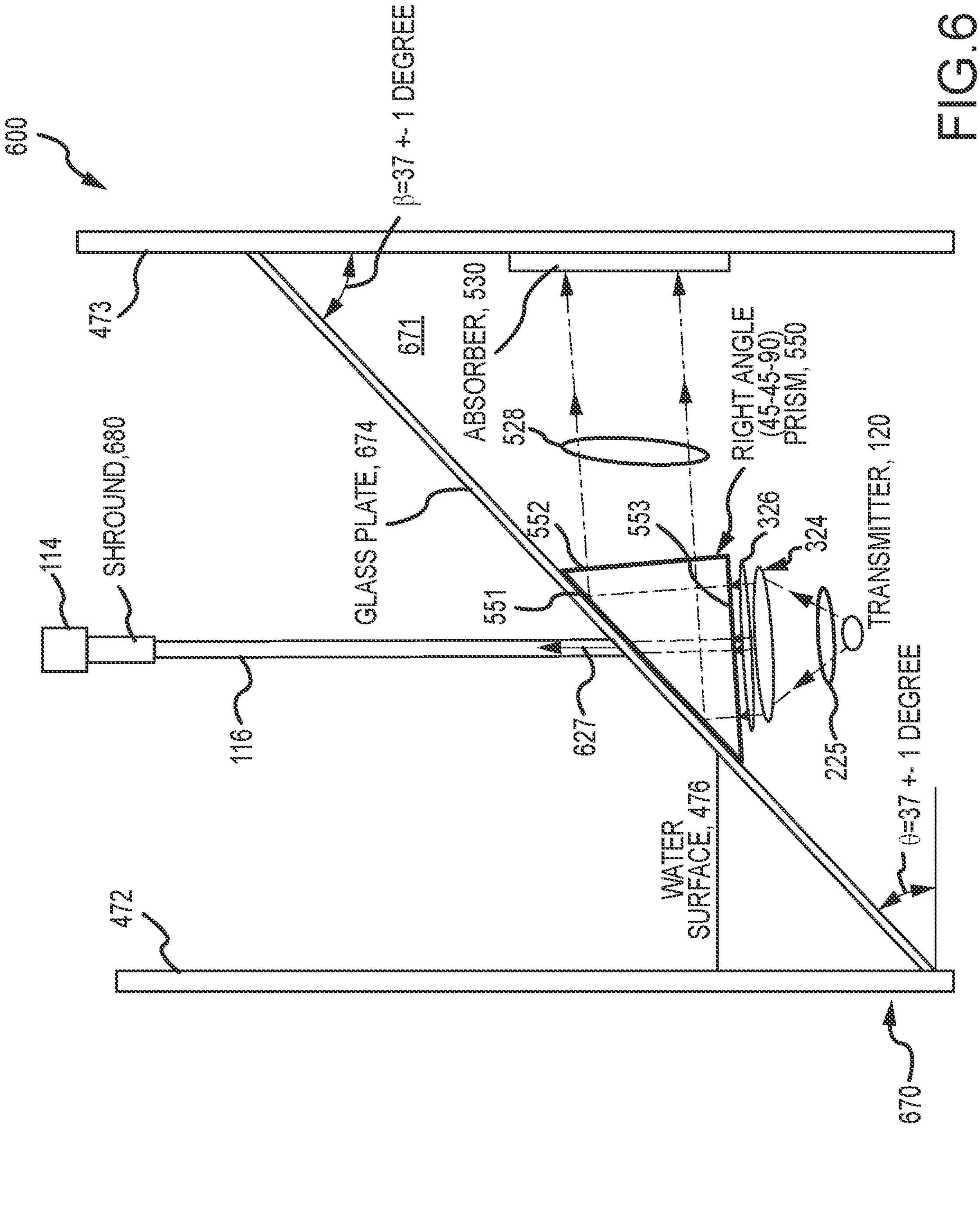
FIG. 6 illustrates another embodiment of a display or interactive play system configured to isolate electronic components from water while enhancing index matching between the falling water stream and the sloped landing surface.

In some embodiments, it may be useful to include all the transmission optics in a dry space to isolate it along with the electronics from the water in the system. Also, the system may be configured to enhance index matching. To this and other ends, FIG. 6 illustrates another embodiment of a display or interactive play system 600 configured to isolate electronic components from water while enhancing index matching between the falling water stream and the sloped landing surface.

As shown, the reservoir 670 includes an angled or sloped bottom 674 (which again likely would be made of glass or another transparent material) rather than one perpendicular to the sidewalls 472 and 473. Relative to horizontal, the lower edge or end of the reservoir bottom 674 is at an angle, θ, that is chosen to be in the range of 52 to 54 degrees while the upper edge or end of the reservoir bottom 674 is at an angle, β, that is chosen to be in the range of 36 to 83 degrees. The hypotenuse side 551 of the solid prism 550 is mated to the lower side of the reservoir bottom 674, e.g., optically bonded for the index of refraction techniques described herein to work properly. In this way, all of the optical components as well as the electronics associated with the transmitter 120 can be positioned in a dry space 671 to be isolated from the water in the reservoir 670. In other embodiments, the prism is formed integrally with the reservoir bottom 674 such that the hypotenuse side 551 receives the stream 120 directly rather than the bottom 674.

The angles, θ and β, are chosen to achieve enhanced index matching between the water stream 116 and the solid prism 550. Because the index of refraction of water is approximately 1.33 and the index of refraction of a glass prism 1.5, it is useful to tilt the top or hypotenuse side 551 of the prism 550 approximately 7 degrees (or in the range of 6 to 8 degrees), which is achieved with the angular orientation of the glass bottom 674 discussed above. This compensating tilt of the prism 550 as well as lens 324 and transmitter 120 is useful to cause light that is being injected 627 into the water stream 116 to enter the stream 116 parallel to its orientation, thereby ensuring that the light 627 will be carried by total internal reflection up the stream 116 and not leak out of is sides. To further increase the signal-to-noise performance of the system 600, an optical shroud 680 is added that is configured to surround the top end of the flow 116 and/or the outlet of the nozzle 114 to limit, at the nozzle 114, the fiber optic capture effect breaking down, which could allow light leaking from a bottom transmitter 120 from reaching the receiver.

Figure 7:
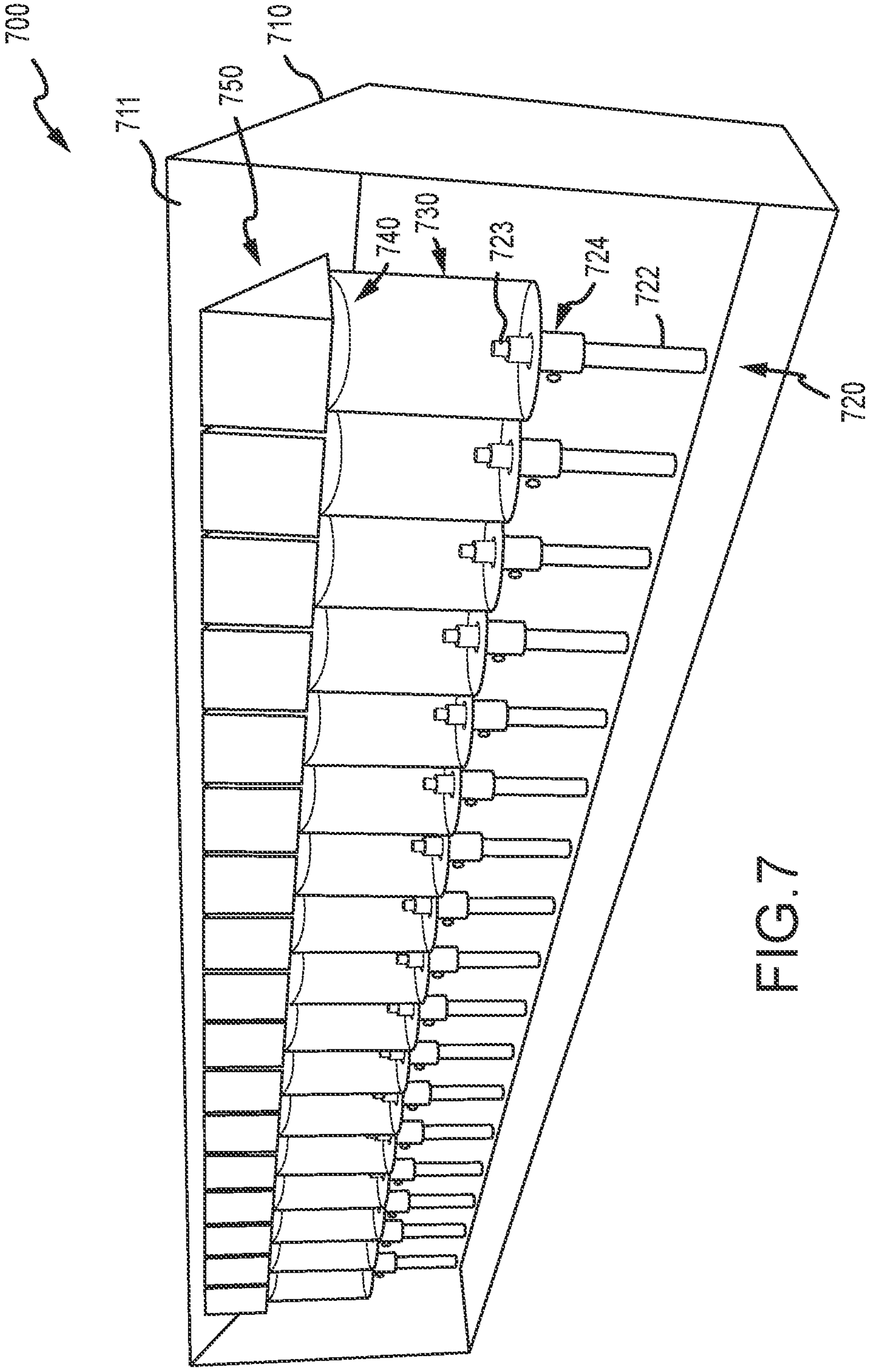
FIG. 7 illustrates a bottom light emitter array for use with display or interactive play systems of any of FIGS. 5 and 6.

As discussed above, a typical display or interactive play system described with reference to FIGS. 1-6 would include one-to-many string or stream assemblies rather than the single stream or string shown in these simplified illustrations. In this regard, FIG. 7 illustrates a rear view of a bottom light emitter array 700 that may be positioned in a water reservoir and operated to provide a plurality of light streams that can be injected into a like number of falling laminar water streams. Particularly, a plurality of light emitter or transmitter assemblies are shown to be mounted in parallel and in a side-by-side arrangement in the array 700 with physical support and alignment being provided by the support frame 710. An exemplary assembly 720 being labeled with reference numbers and will be described in more detail below, with its construction duplicated for the other shown assemblies.

As shown, the assembly 720 includes an optical fiber 722 (e.g., sheathed, ¼-inch optical fiber or the like) with an end 723 from which the sheathing has been stripped back (e.g., 0.1 to 0.5 inches). A mounting assembly 724 is provided on the fiber 722 to mate it with a lower end of a focusing tube 730, shown to be clear but would typically be formed of an opaque material such as an opaque plastic or the like, and the mounting assembly 724 is configured, such as with a locking screw as shown, to allow the fiber end 723 to be moved vertically up and down so as to focus its output. In one embodiment, for example, the fiber end 723 if positioned within the focusing tube to provide a parallel beam with a diameter in the range of 1 to 3 inches, with 2 inches used in one prototype of array 700. The focusing tube 730 may have a length in the range of 4 to 12 inches or more, with an inner diameter chosen to suit (e.g., match or nearly so) a diameter of the output light of the fiber 722 and/or the outer diameter of the lens 740.

In this regard, the assembly 720 includes a lens 740 mounted to the upper or second end of the focusing tube 730 opposite the unsheathed fiber end 723. A variety of lenses may be used for lens 740, with each typically being configured to output collimated light in a stream or beam with a diameter matching or somewhat smaller than the outer diameter of the lens 740. In one useful embodiment, a plano-convex lens that had a 2-inch diameter and a 4-inch focal length. The planar side of the lens 740 is shown to be mated with a bottom side of a 45-45-90 solid prism 750, which may be formed of glass, plastic, or the like. The hypotenuse side of the prism 750 is mated, e.g., optically bonded or cemented, to the angled or sloped reservoir bottom or splash preventer 711 in the support frame 710 (with angling as described for system 600 of FIG. 6, for example). The lens 740 also would be optically bonded or cemented to the flat face or lower side of the prism 750.

The support frame 710 may be configured to include a holder for all the components of each assembly 720 or for each string or playable note. In some cases, the support frame 710 would include a rack to support each of these holders, and the holders would be slidable on the rack to allow the streams or harp strings to be spaced apart the same or differing distances (e.g., place treble strings closer together and bass strings further apart similar to many stringed instruments or place strings at varying distances to suit a desired aesthetic configuration of a system designer).

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

The light transmitter or source used in the display or harp systems described herein can take a wide variety of forms to implement the invention. In some cases, the light transmitter is chosen to provide visible light. However, in other cases, it is desirable for the light used to detect when a water stream is interrupted or played be invisible to the naked eye, and, in such cases, the light transmitter may be an infrared (IR) LED or other IR source. To further isolate each string or water stream, the light transmitters may be selected to provide modulated light or light of differing frequencies for each water stream or at least so as to differ for adjacent streams/strings to limit false positives.

In such embodiments, though, there may be calls for visible light to also be input into the stream to allow the person playing the water harp to better see the streams or strings, which may have the same or differing colors. To this end, a visible light source, transmitter, or "flashlight" may be positioned between the vertical side of the prism and the light absorber (components 552 and 530 in FIG. 6), with its output directed toward the prism. During operation of such a system, visible light from the "flashlight" enters the "waste" side of the prism, bounces off the slanted or hypotenuse side of the prism, goes down through the bottom of the prism and is focused on the face of the IR LED and its heatsink. This light then is reflected back upward to go back up into the prism to be, at least partially, injected into the lower end of falling water stream. If the stream is then broken, the light from the "flashlight" will hit the player's body part or instrument used to interrupt the falling water stream or water harp string. To overcome losses, a very bright visible light source or flashlight may be preferrable.

Although one light source or transmitter was shown to be provided for each water stream, it may be useful in some cases to utilize a light source to provide light to two or more of the water streams or harp strings. This can be achieved with an optical system that generates a "flood" of upward directed light to service more than a single water stream at a time. In one implementation, this is achieved using a honeycomb optical filter that only passes vertically directed light but through a plurality of outlets or holes in the honeycomb design. The optical filter is configured to only direct vertically moving light upward into each water stream in a manner that prevents the nozzle receiver of one water stream from detecting light from an off-axis light source. In such embodiments, the output light from the honeycomb or "holey" filter is somewhat collimated, and, as a result, these embodiments may or may not include the collimating lenses or lens systems. Likewise, one or more large prisms may be used in place of the plurality of separate ones shown in FIG. 7.

The use of optical fibers to provide input light and to receive output light from each of the harps' water strings is useful in many implementations such that there are no electrical components (e.g., optical transmitters and receivers) at or within the harp itself. Further, even the water being used to provide the laminar falling streams or harp strings can be provided to the harp in a remote manner such as from a remote pump, and, in this manner, even the electricity used to operate the water pump(s) can be electrically isolated from the harp (e.g., from the water reservoir space in which players will be located while interacting with or playing the harp.

Figure 8:
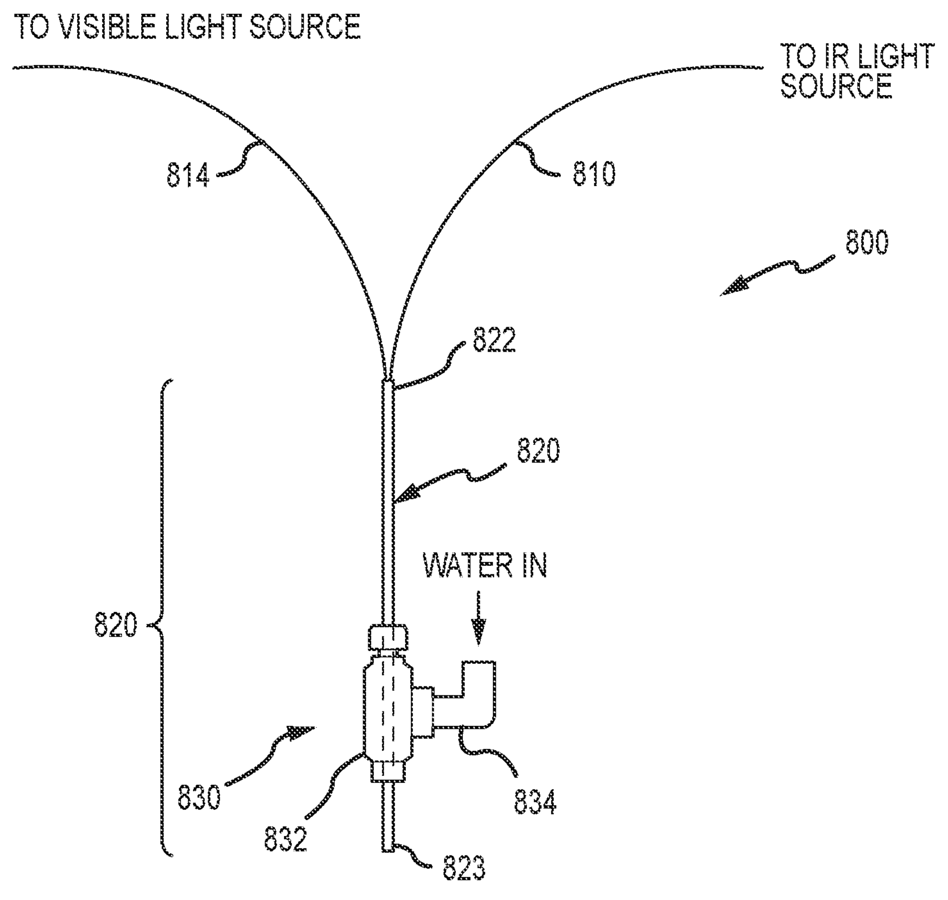
FIG. 8 is a side, partial cutaway view of a light transmitter or source assembly useful for injecting both IR and visible light into a water stream for use in any of the interactive play systems described in FIGS. 1-7.

As discussed above, it may be desirable to provide visible light and IR light concurrently (or sequentially) into one or more of the "strings" or water streams of an interactive play system to enhance the user's experience. FIG. 8 is a side, partial cutaway view of a light transmitter or source assembly 800 useful for injecting both IR and visible light (from visible and IR light sources indicated in FIG. 8 but not specifically shown) into a water stream for use in the interactive play systems described in FIGS. 1-7 (e.g., the holder or harness may be used in all embodiments while the laminar water flow manifold may be useful in the systems of FIGS. 1 and 2). The specific physical or mechanical arrangement of the components may vary to practice the invention with the assembly 800 being one useful implementation.

As shown, the assembly 800 includes a first fiber optic strand (or fiber optic cable) 810 that is coupled at an input or first end with an IR light source and a second fiber optic strand (or fiber optic cable) 814 that is coupled at its input or first end with a visible light source. In order to introduce two bandwidths of light (e.g., IR light for control sensors and visible light for show effects) into a laminar water stream of the harp or other instrument, the inventors developed a unique fiber optic harness assembly 820.

As shown, the two fiber optic cables 810 and 814 (which may be 0.75 mm strands) are routed from respective IR and visible light illuminators or sources. The strands 810 and 814 are merged and potted into an elongated holder or harness 821 so as to extend outward from a first end 822 proximate to the light sources and to be recessed from or flush with a second end 823. In one embodiment or prototype, the holder 821 took the form of an 8-inch length of 304 stainless steel tubing that can be secured with epoxy and polished to provide a harness system that enables harp functionality and show effects combining two bandwidths of light. The harness 820 could be readily scaled such as to include more fiber optic cables to supply three or more bandwidths of light rather than the two shown, and it may be used alone or as part of any of the light sources or transmitters shown herein.

The assembly 820 further includes a manifold 830 in some embodiments. During testing of water harp systems, it was determined that a weir-based laminar flow system can be prone to some false triggers due to the introduction of air bubbles and debris into certain nozzles. To address this problem, the harness assembly was configured to include a novel tee assembly to merge the visible and IR light while making the system significantly more reliable and reducing false signals. As shown, the manifold (or tee) assembly 830 includes a tee 832, such as a ⅜" female NPT tee or the like, and the harness or holder 821 has its second end 823 inserted through the top of the tee 832 until it extends outward a predefined distance as shown (such as 0.5 to 2 inches or the like). The holder 821 with the fiber optic cables 810, 814 may be secured in the tee 832 with a submersible cord grip or by other techniques. The manifold 830 further includes a water inlet fitting 834, e.g., a 90-degree ⅜" push-to-connect fitting or the like, and, in use, water flows into the side of the tee 830 through this fitting 834 and exits via the outlet of the tee 832 through which the holder 821 also extends. The tee 832 may be coupled to the system at one of the laminar stream locations in an existing upper weir, such as by using a ⅜" NPT pipe nipple that threads into an existing PVC fitting or the like, and the components of the assembly 820 may be formed of stainless steel (e.g., 304SS or the like).

In some embodiments, the light sensor and/or receiver was selected to address issues with detecting the signal light bandwidth through the potentially obstructive components such as those found in the laminar stream embodiments of the harps or stringed instruments. The sensors chosen were capable of operating under an extremely attenuated signal to enhance the functionality of each water-based interactive play system. In one useful implementation, for example, an IR sensor available from Tenco Sensors, Inc. was provided to sense the presence of IR light in the laminar stream or "string."

We claim:

1. A system for simulating operation of a stringed instrument using water and light, the system comprising:
- a nozzle configured for outputting a water stream, when supplied by a water source, that falls vertically and is substantially laminar;
- a light transmitter configured to inject light into a first end of the water stream, wherein the light transmitter is positioned a vertical distance below the nozzle, and wherein the first end of the water stream is a lower end;
- a light receiver configured to receive, at a second end of the water stream, the light injected into the water stream and, in response, to generate a signal; and
- a controller configured to:
  - detect the signal, and
  - in response to a lack of the signal, operate an audio system to play a musical note or audio file.

2. The system of claim 1, further comprising an optical fiber with a first end proximate to the nozzle and oriented to receive, at the second end of the water stream, the light injected into the water stream, wherein the light receiver is a photodetector.

3. The system of claim 1, further comprising a lens or lens system disposed between the nozzle and the light transmitter, the lens or lens system configured to receive output light from the light transmitter and convert the output light into collimated light that is directed upward toward the nozzle.

4. The system of claim 3, further comprising a water reservoir comprising two or more sidewalls and a bottom defining an interior space for receiving the water stream, wherein the bottom of the water reservoir is substantially transparent to light, and wherein the lens or lens system and the light transmitter are positioned in a dry space outside the water reservoir and arranged to direct the collimated light through the bottom of the water reservoir.

5. The system of claim 4, further comprising a sloped landing pad disposed in the water reservoir to at least partially extend above a surface of water in the water reservoir, the sloped landing pad being formed of substantially transparent material and positioned between the lens or lens system and the nozzle, whereby the first end of the water stream is located where the water stream contacts the sloped landing pad.

6. The system of claim 5, further comprising a solid 45-45-90-degree prism and wherein the sloped landing pad is provided by a hypotenuse side of the solid 45-45-90-degree prism.

7. The system of claim 6, further comprising a light absorber on one of the two or more sidewalls of the water reservoir at a location upon which the solid 45-45-90-degree prism directs a portion of the collimated light not passed through the hypotenuse side into the water stream.

8. The system of claim 6, wherein the solid 45-45-90-degree prism is: (i) integrally formed with the bottom of the water reservoir, or (ii) positioned below and optically bonded to the bottom of the water reservoir, wherein the bottom of the water reservoir extends from a first end mating with a first one of the two or more sidewalls to a second end mating with a second one of the two or more sidewalls.

9. The system of claim 6, wherein at least a portion of the light transmitter, the lens or lens system, and the solid 45-45-90-degree prism forms a light transmission assembly.

10. The system of claim 1, wherein the light transmitter comprises an infrared (IR) light source and wherein the system further comprises a visible light source illuminating the water stream with visible light.

11. The system of claim 10, wherein the light transmitter further comprises tubing with (i) a first optical fiber coupled at a first end to the IR light source and having a second end flush or recessed from an end of the tubing, and (ii) a second optical fiber coupled at a first end to the visible light source and having a second end flush or recessed from the end of the tubing.

12. The system of claim 11, wherein the light transmitter further comprises a manifold comprising a tee, wherein the tubing extends through the tee with the end of the tubing extending outward from an outlet of the tee a predefined distance, and wherein the manifold further includes a 90-degree fitting coupled to the water source operable to output water via the outlet of the tee.

13. The system of claim 9, wherein:
- the system includes a plurality of the light transmission assemblies;

the system further comprises a support frame with holders each holding one of the light transmission assemblies; and the holders are slidably supported on a rack in the support frame, whereby each of the light transmission assemblies can be selectively positioned to adjust spacing between adjacent pairs of the light transmission assemblies.

14. A system for simulating operation of a stringed instrument using water and light, the system comprising:

a nozzle configured for outputting a water stream, when supplied by a water source, that falls vertically downward from an upper end to a lower end;

a light transmitter configured to inject light into the lower end of the water stream;

a light receiver configured to receive, at the upper end of the water stream, the light injected into the water stream and, in response, to generate a signal; and a lens or lens system disposed between the nozzle and the light transmitter, the lens or lens system configured to receive output light from the light transmitter and convert the output light into collimated light that is directed upward toward the lower end of the water stream.

15. The system of claim 14, further comprising a solid 45-45-90-degree prism formed of transparent material and disposed between the lens or lens system to receive the collimated light on a first side, wherein a second, hypotenuse side of the solid 45-45-90-degree prism is positioned to provide a sloped surface receiving the water stream at the lower end of the water stream.

16. The system of claim 14, further comprising a water reservoir comprising two or more sidewalls and a bottom defining an interior space for receiving the water stream, wherein the bottom is substantially transparent to light, and wherein the lens or lens system and the light transmitter are positioned in a dry space outside the water reservoir and arranged to direct the collimated light through the bottom of the water reservoir.

17. The system of claim 16, wherein the bottom of the water reservoir extends from a first end mating with a first one of the two or more sidewalls to a second end mating with a second one of the two or more sidewalls.

18. The system of claim 16, wherein the solid 45-45-90-degree prism is integrally formed with the bottom of the water reservoir or positioned below and optically bonded to the bottom of the water reservoir.

19. The system of claim 15, wherein at least a portion of the light transmitter, the lens or lens system, and the solid 45-45-90-degree prism forms a light transmission assembly.

20. The system of claim 14, wherein the light transmitter comprises a light source and a honeycomb optical filter disposed between the light source and the lower end of the water stream, the honeycomb optical filter being configured to direct a plurality of streams of vertically directed light into a plurality of water streams including the water stream, whereby a single light source can be used to direct light into the plurality of water streams.

21. A system for simulating operation of a stringed instrument using water and light, the system comprising:

a light transmitter assembly configured to inject collimated light into a lower end of a falling laminar water stream;

a light receiver configured to receive the light injected into the water stream at or near an upper end of the water stream and, in response, to generate a signal;

a controller configured to process the signal and, in response, selectively operate an audio system to play a musical note or audio file; and a sloped landing pad disposed between the light transmitter and the light receiver, the sloped landing pad being formed of substantially transparent material, wherein the lower end of the water stream contacts the sloped landing pad.

22. The system of claim 21, further comprising a solid 45-45-90-degree prism and wherein the sloped landing pad is provided by a hypotenuse side of the solid 45-45-90-degree prism.

23. The system of claim 22, further comprising a water reservoir comprising sidewalls and a bottom, wherein the solid 45-45-90-degree prism is: (i) integrally formed with the bottom of the water reservoir, or (ii) positioned below and optically bonded to the bottom of the water reservoir, wherein the bottom of the water reservoir extends from a first end mating with a first one of the sidewalls to a second end mating with a second one of the sidewalls.

24. The system of claim 23, wherein the bottom of the water reservoir is sloped with the first end at a first angle relative to horizontal in the range of 52 to 54 degrees and with the second end at a second angle relative to vertical in the range of 36 to 38 degrees.

* * * * *